United States Patent [19]

Ito

[11] 3,766,530

[45] Oct. 16, 1973

[54] COMMUNICATIONS BETWEEN CENTRAL UNIT AND PERIPHERAL UNITS

[75] Inventor: Roy Atsushi Ito, Los Angeles, Calif.

[73] Assignee: RCA Corporation, New York, N.Y.

[22] Filed: July 21, 1972

[21] Appl. No.: 273,749

[52] U.S. Cl. .................................... 340/172.5

[51] Int. Cl. .................... G06f 9/18, G06f 3/04

[58] Field of Search ........................ 340/172.5

[56] References Cited

UNITED STATES PATENTS

| | | | |
|---|---|---|---|
| 3,665,406 | 5/1972 | Gallagher et al. | 340/172.5 |
| 3,411,143 | 11/1968 | Beausoleil et al. | 340/172.5 |
| 3,512,133 | 5/1970 | Bennett et al. | 340/172.5 |

*Primary Examiner*—Gareth D. Shaw
*Attorney*—H. Christoffersen et al.

[57] ABSTRACT

A central processing unit interrogates peripheral devices under its control to determine the ones requiring servicing. Those which do, are placed in a queue and then serviced in sequence. After the servicing is completed of all the units in the queue, the process is repeated.

6 Claims, 4 Drawing Figures

COMMUNICATIONS BETWEEN CENTRAL UNIT AND PERIPHERAL UNITS

BACKGROUND OF THE INVENTION

There are many methods available for determining which among many peripheral units under the control of a central processor require servicing. Some require that the peripheral units be addressed either in some regular sequence or in accordance with certain priority rules. These employ relatively complex circuits and the interrogating procedure is time consuming. Others require the units requesting service to employ manual actuation of a relay or the like at the peripheral unit. In many cases, this may be inconvenient. Others operate in closed loop fashion with each unit including means for transmitting an interrogating signal to the next unit in the loop. Here, in the case of a large loop, a unit which has just been serviced and which shortly thereafter again requires servicing, will have to wait until the interrogating signal travels through all of the remaining units in the loop.

SUMMARY OF THE INVENTION

In a system according to the invention, an interrogation signal initially is sent to all peripheral units. In response to this signal, those requesting service are placed in a waiting queue and then serviced in sequence. After the servicing is completed of all units in the queue, the following interrogation signal causes another waiting queue to be established, and then continues the same process.

DETAILED DESCRIPTION

Figure 1:
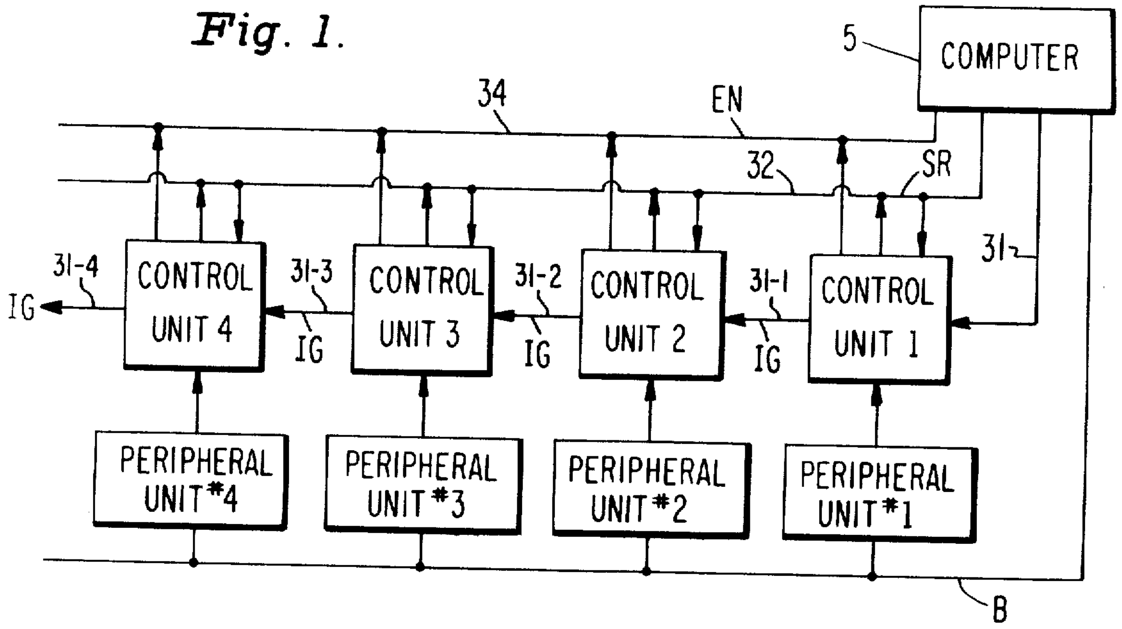
FIG. 1 is a block diagram of the system embodying the invention.

The system of FIG. 1 includes a computer 5 and a number of peripheral units, four of which are illustrated. The lower numbered units are located closer to the computer than the higher numbered units. Each peripheral unit is connected to a control unit and the control units are connected via lines 31, 32 and 34 to the computer. These are control lines. The peripheral units are also connected to the computer via bus B. This may be a single wire or multiple conductors, depending on the particular system design and it is over this bus that data flows between the peripherals and the computers.

In the operation of the system of FIG. 1, the computer sends successive interrogate signals (IG) down line 31. Those peripheral units requiring servicing generate a flag signal (FL). If when an IG signal occurs, no peripheral units are being serviced, those requesting service are placed in a queue. As will be shown shortly, this is accomplished by causing the IG signal to reach all control units via the lines 31, 31-*l* . . . 31-*n* and having this signal set the flip-flop 16 (FIG. 2) in those of the control units connected to peripheral units requesting servicing.

During the time any unit is being serviced, the computer 5 continues to generate the IG signals. When such a signal reaches a unit being serviced, the latter prevents that signal from being transmitted to the next unit waiting in the queue.

The fact that a peripheral unit is being serviced is indicated by a low, service request (SR) signal produced by its control unit and placed on line 32. When the servicing of a peripheral unit is completed, (any transmission between the computer and peripheral unit or vice-versa is completed) the peripheral unit produces an end of operation signal (EN) which it sends back to the computer via line 34. The next interrogate signal (IG) which occurs then passes to the next control unit in the waiting queue. After all waiting units have been serviced, the next IG signal sets up a new queue.

Figure 2:
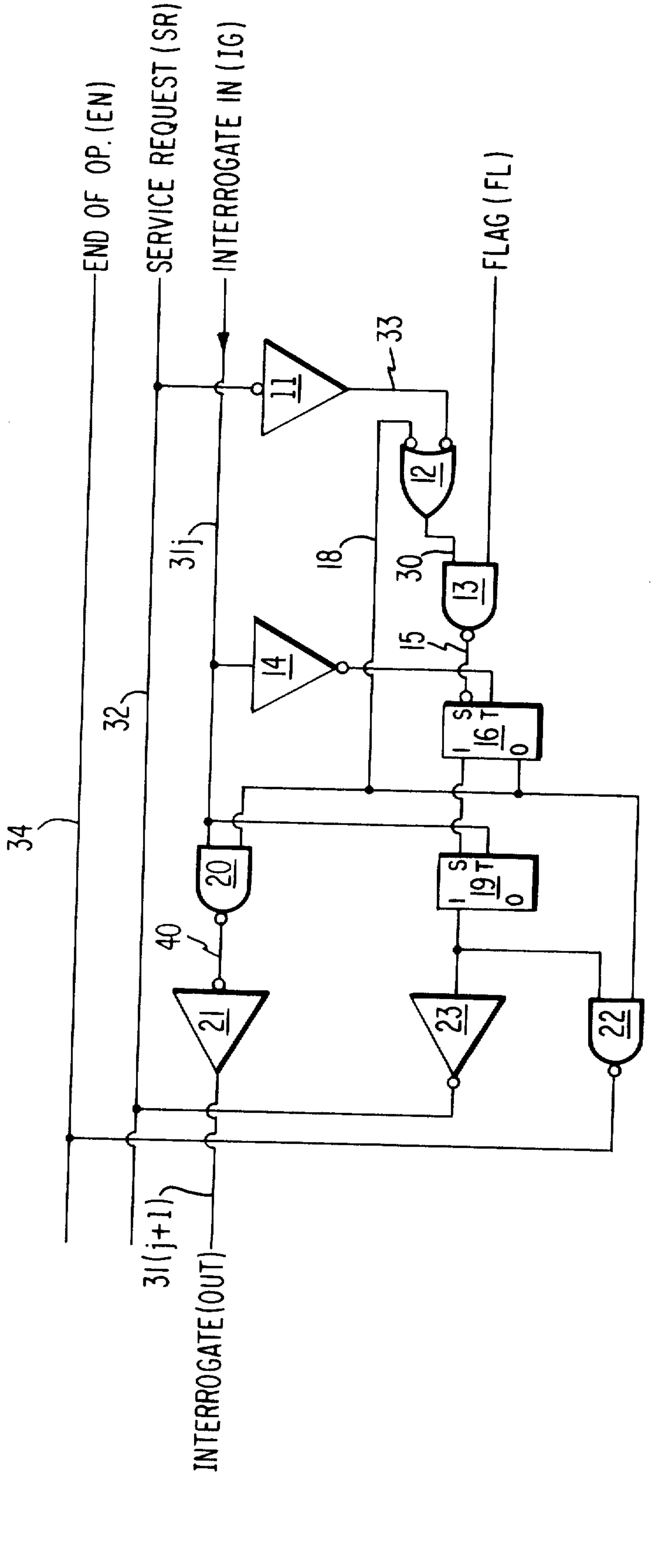
FIG. 2 is a block diagram of one of the control units shown in FIG. 1.

FIG. 2 is a block diagram of a control unit. As all control units are identical, only one of them is illustrated. The unit includes an inverter 11 connected to the service request line 32. The inverter connects to a NAND gate 12 which, in turn, connects to a NAND gate 13. While the symbols for gates 12 and 13 are different, these gates perform the same logical function. The difference is that the "true" signal for gate 12 is low (indicated by the small circle at the input lead) while the "true" signal for gate 13 is high, as indicated by the absence of the circle. In both cases, when both input signals are high, the gate produces a low output signal and at other times produces a high output signal. The symbols employed are standard gate symbols well understood in this art.

NAND gate 13 connects to the set (S) terminal of flip-flop 16. The 1 output terminal of flip-flop 16 connects to the set (S) terminal of flip-flop 19 and the O output terminal of flip-flop 16 connects to an input terminal of NAND gate 12, to an input terminal of NAND gate 20, and to an input terminal of NAND gate 22. The 1 output terminal of flip-flop 19 connects to inverter 23 and to an input terminal of NAND gate 22. NAND gate 22 connects to line 34. Inverter 23 connects to line 32. The flat signal (FL) is applied to NAND gate 13.

Figure 3:
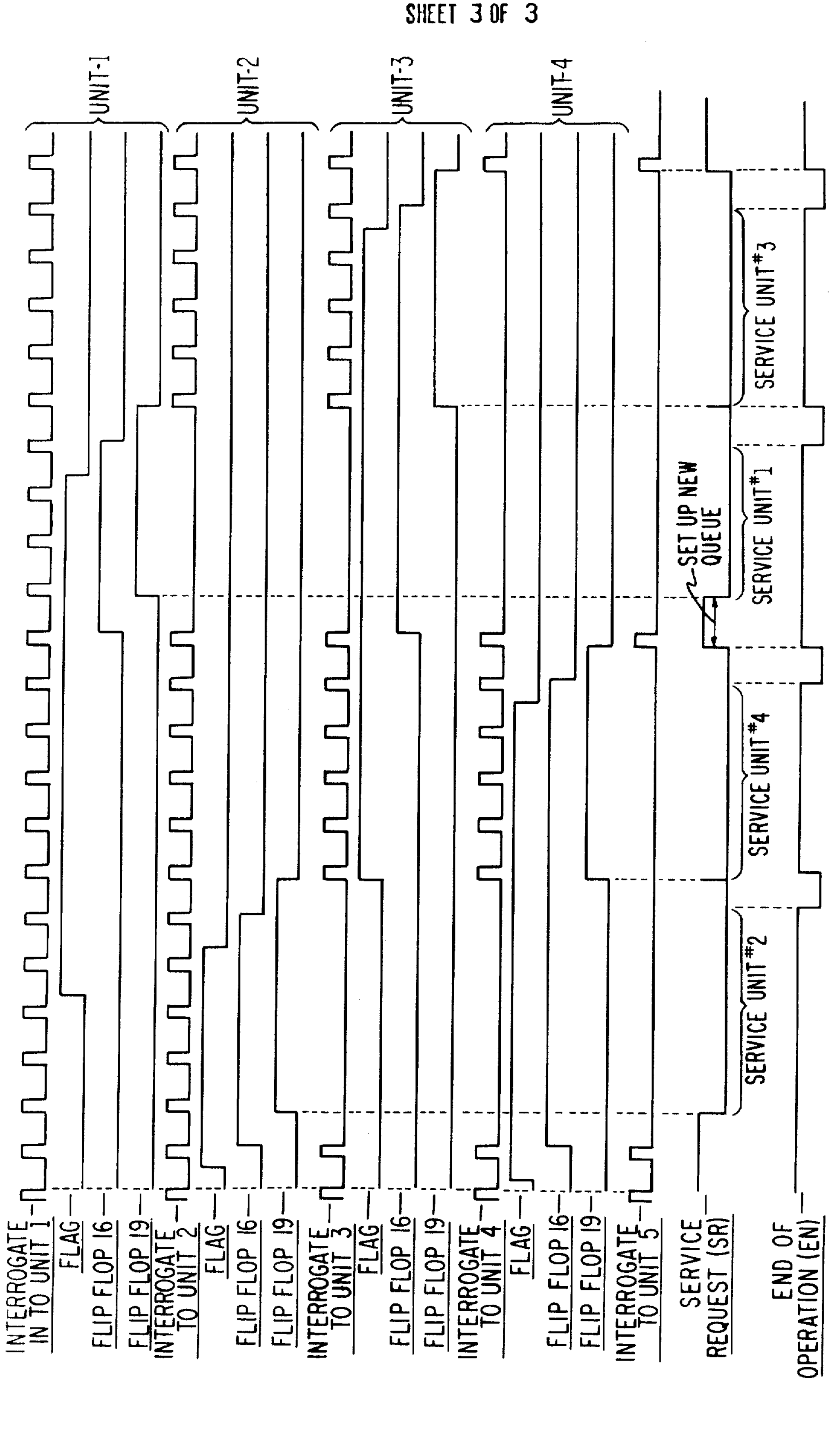
FIG. 3 is a drawing of waveforms which are produced in the system of FIG. 1.

In the operation of the system, assume that the flag signals produced by peripheral units 2 and 4 are high (represent a 1) and the flag signal for the remaining two peripheral units 1 and 3 is low (represents a O). Assume also, as shown in FIG. 3, that the flag signals for units 2 and 4 go high at roughly the same time; that is, in the interval between a given pair of interrogate pulses, and when no unit is being serviced (SR is high representing a 1). It also may be assumed that FIG. 2 represents control unit 2—the one closer to the computer than unit 4.

As FL = 1, NAND gate is primed. Flip-flop 16 is reset so that a high is present at its O output terminal, which high is applied via lead 18 to NAND gate 12. The service request signal SR is high, indicating that no unit is being serviced. Accordingly, inverter 11 applies a low, via lead 33, to NAND gate 12. As gate 12 receives a high and a low, it applies a high, via lead 30, to NAND gate 13. NAND gate 13 therefore receives two highs and applies a low, via lead 15, to the set terminal for flip-flop 16. This signal is of the correct sense to set the flip-flop when a positive-going signal is applied to the trigger terminal.

Assume now that an interrogate pulse (IG) appears on line 31j while SR is high. This is a short, positive-going pulse, as shown in FIG. 3. Gate 20 is primed by the high level at the O output terminal of flip-flop 16 so that the IG pulse enables NAND gate 20 and appears as a negative-going pulse at lead 40. The negative-going pulse is inverted by inverter 21 and appears as a positive-going pulse on the interrogate output line 31 ($j$ + 1). This occurs at each and every control unit, the interrogate pulse (IG) passing from line 31 to 31-1, to 31-2, to 31-3, to 31-4 (see FIG. 1).

At the lagging edge of this interrogate pulse, inverter 14 applies a high to the trigger terminal of flip-flop 16. This flip-flop now becomes set as a low is present at its set terminal. Similarly, the flip-flop 16 in all other control units in which the flap signal is high becomes set. The waiting queue is now formed. In the present example, the queue consists of control units 2 and 4. Control units 1 and 3 are not in the queue and their flip-flop 16 remains reset. (It remains reset because when the lagging edge of the IG pulse occurs, the signal at 15 is high.)

When flip-flop 16 of control unit 2 becomes set, the signal at its 1 terminal goes high and the signal at its O terminal goes low. The low signal disables gate 20. All succeeding interrogate pulses (IG) are now prevented from reaching the units to the left of the control unit shown, until the servicing of peripheral unit 2 by the computer 5 is completed. The low output at the O terminal of flip-flop 16 also keeps gate 22 disabled so it continues to apply a high signal EN = 1 to line 34.

When the next interrogate pulse (IG) occurs, flip-flop 19 becomes set as there is a high present at its set terminal. Gate 22 now is primed by the high present at its I output terminal; however, in view of the low present at its other input terminal, it continues to apply a high to line 34. However, inverter 23 now applies a low to the service request line 32. This indicates to the computer and to the other control units that one of the peripheral units is being serviced. Communications via bus B (FIG. 1) now may commence between the selected peripheral unit (unit 2 in this case) and the computer.

During this period, flip-flop 16 applies a low via lead 18 to NAND gate 12 to maintain NAND gate 13 enabled. Thus, even though the service request line 32 goes low, flip-flop 16 remains locked in its reset condition, since lead 15 continues to carry a low (both inputs to gate 13 are high). In other words, the serially occurring IG pulses have no effect on this flip-flop.

When peripheral unit 2 has completed its interaction with the computer, its flag signal (FL) goes low. This disables NAND gate 13 and its output signal on lead 15 goes high. Now the next time an interrogate pulse IG occurs, it is inverted by inverter 14 and its lagging edge (a positive-going signal) resets the flip-flop. At this time, flip-flop 19 is still in its set state. Accordingly, NAND gate 22 receives two highs and it applies a low, end of operation signal (EN) to line 34.

The high at the O output terminal of flip-flop 16 also primes NAND gate 20 and also is applied to NAND gate 12. As the service request signal SR is still low at this time, inverter 11 also applies a high, via lead 33, to the second input terminal to NAND gate 12. Accordingly, NAND gate 12 applies a low via lead 30 to NAND gate 13 and NAND gate 13 applies a high to flip-flop 16. What all this means is that the feedback from the O output terminal of flip-flop 16 via gates 12 and 13 locks the flip-flop 16 in its reset state. It remains so locked for as long as SR remains low (for as long as any unit in the waiting queue has not been serviced), even if, during the servicing of any following unit in the queue, the flag signal for the unit just serviced should again go high.

In response to the leading edge of the next interrogate pulse, flip-flop 19 becomes reset in view of the low present at its set terminal. This next interrogate pulse passes through gate 20 and inverter 21 and sets the flip-flop 19 of the next control unit waiting in the queue. In the meantime, the reset flip-flop 19 in the control unit shown in FIG. 2 applies a low to NAND gate 22 so that it returns line 34 to a high level. The inverter 23 receives a low from flip-flop 19 so that line 32 starts to return to a high level (indicated by a positive-going spike in FIG. 3. However, the inverter 23 in the next control unit being serviced receives a high from its flip-flop 19 and maintains SR low, that is, it keeps line 32 at a low level.

Note that in the process described above, the interrogate pulse passing through control unit 2 also passes through control unit 3 before it reaches control unit 4. However, as control unit 3 is not waiting in the queue, its flip-flop 16 is reset. Thus, its gate 20 is primed and passes the interrogate pulse.

FIG. 3 illustrates the following. First, the units 2 and 4 request service. They are placed in a queue and serviced in succession, unit 2 being serviced first. During the time unit 2 is being serviced, the flag signal for unit 1 goes high. Thus is ignored until the servicing of unit 4 is completed. The flag signal for unit 3 goes high at about the time the servicing of unit 4 starts and this too is ignored at that time. However, when the servicing of unit 4 is completed, a new queue is formed and units 1 and 3 are placed in this new queue and serviced in sequence.

Figure 4:
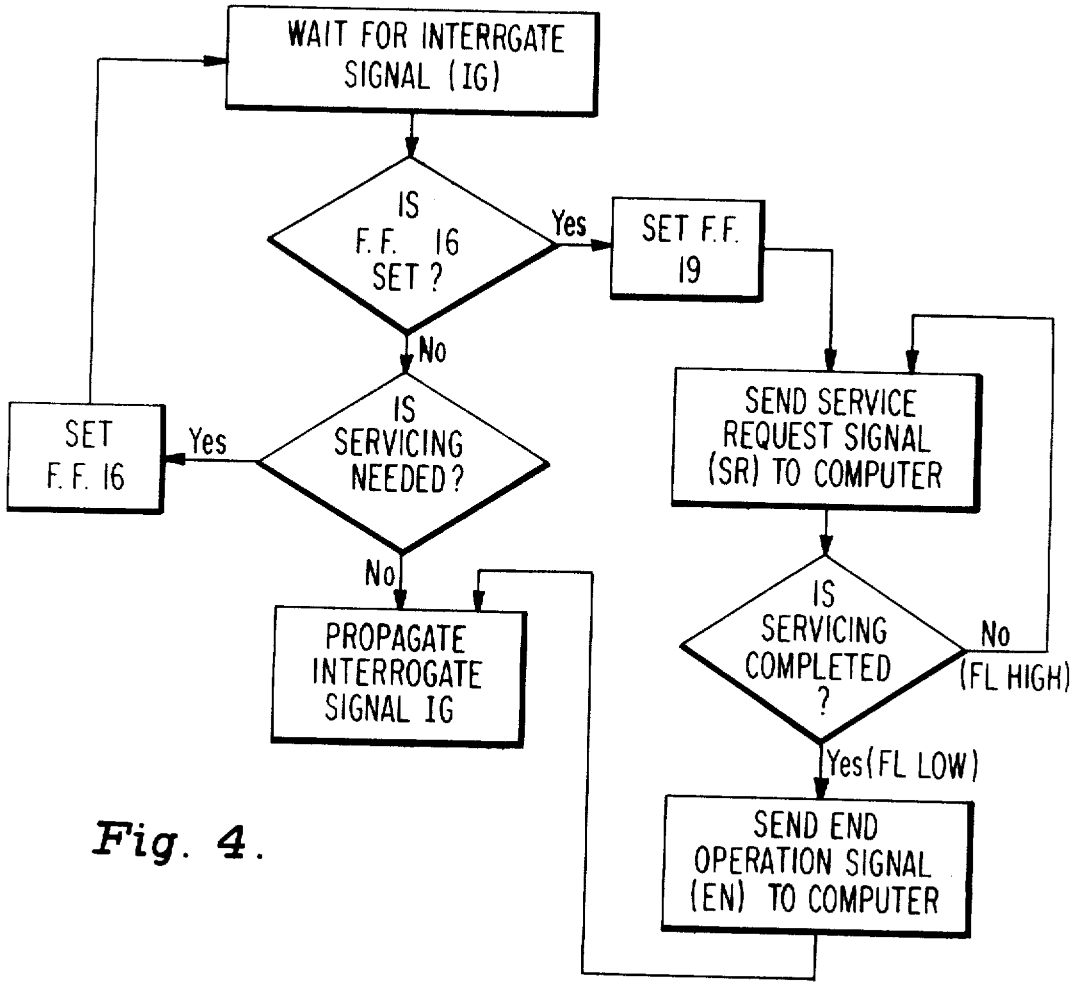
FIG. 4 is a flow chart illustrating the operation of the system of FIG. 1.

The flow chart of FIG. 4 shows, in another way, the general operation discussed above. The chart is believed to be sufficiently clear that no further discussion is necessary.

What is claimed is:

1. In a system including a control unit coupled to a plurality of peripheral devices, in combination:

means at each peripheral device for producing a flag signal to indicate that it needs servicing;

means at the control unit for transmitting to all peripheral devices, during a period none of them is being serviced, an interrogate signal for placing in a first queue the ones of the peripheral devices producing a flag signal;

means at the control unit for then serivcing, in sequence, only the devices in the queue;

means at each peripheral device for indicating when its servicing is completed; and means at the control unit responsive to an indication that the servicing of all peripheral devices in the first queue is completed, for placing in a new queue all devices at that time producing a flag signal.

2. In a system as set forth in claim 1, said means for servicing including means for transmitting to the first device in the queue a second interrogate pulse to indicate the start of a servicing period for that device.

3. In a system as set forth in claim 2, said control unit including means for transmitting interrogate signals sequentially at a rate such that many may occur during a period a peripheral device is being serviced; and each peripheral device including means for preventing an interrogate pulse it receives during a period it is being serviced from being transmitted to the next device in the queue.

4. In a system for communicating between a central control unit and a plurality of peripheral devices, at each peripheral device:

a. first and second flip-flops normally in their reset state;
b. means responsive to an interrogating pulse when the first flip-flop is in its reset state for applying that pulse to means at the following peripheral device;
c. means responsive to an interrogating pulse, a locally produced flag signal and a signal indicating that none of the peripheral devices is being serviced, for setting said first flip-flop and preventing subsequently occurring interrogate pulses from being applied to means at the following peripheral device;
d. means responsive to the interrogating pulse following the one which sets the first flip-flop for setting said second flip-flop;
e. means responsive to the termination of said flag signal followed by an interrogate pulse for resetting said first flip-flop;
f. means responsive to the reset first flip-flop and the set second flip-flop for producing an end-of-operation signal; and
g. means responsive to the interrogate pulse following the one which resets the first flip-flop for resetting the second flip-flop.

5. In a system as set forth in claim 4, further including:

means at each peripheral device for producing an end-of-operation signal when that device is the last one in a group of devices whose servicing has been completed.

6. In a system as set forth in claim 5, further including:

means at each peripheral device for maintaining said first flip-flop in its set state, once it has been set, for as long as said flag signal is present and for maintaining said first flip-flop in its reset state, once it has been reset, for as long as said end-of-operation signal is absent.

* * * * *